United States Patent Office 3,405,610
Patented Oct. 15, 1968

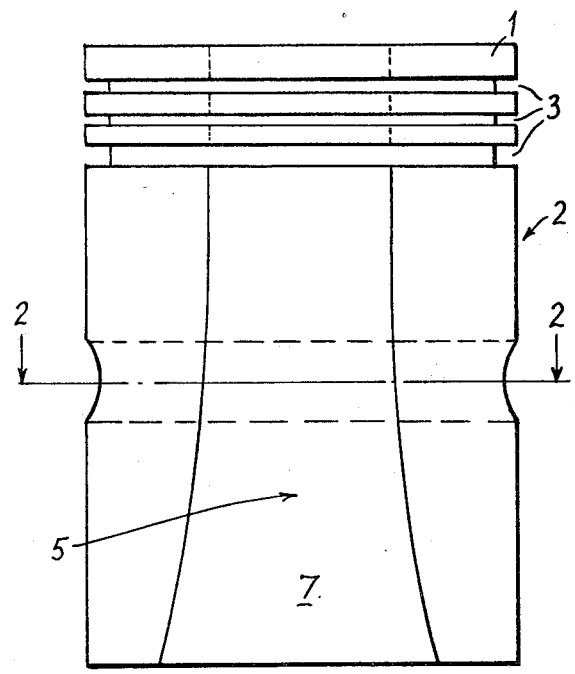
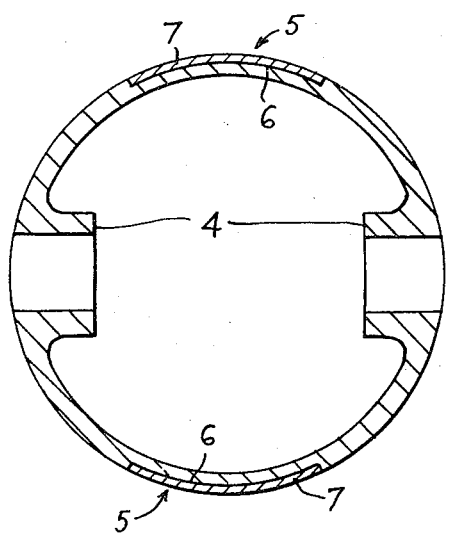

3,405,610
PISTON HAVING SPRAY COATED INLAY
Harold Taylor Hill, Brockenhurst, and Clarence F. Nossiter, Lymington, England, assignors to Wellworthy, Limited, Radial Works, Lymington, Hampshire, England, a British company
Filed July 11, 1966, Ser. No. 564,107
Claims priority, application Great Britain, July 14, 1965, 29,929/65
7 Claims. (Cl. 92—223)

ABSTRACT OF THE DISCLOSURE

This invention relates to a light alloy piston in which the opposed thrust faces of the piston side wall are formed by spray coated inlays of a material possessing bearing characteristics superior to those of the alloy of the piston.

The present invention relates to pistons for internal combustion engines or other prime movers such as compressors, refrigerators, air pumps or the like, and more particularly to light metal or alloy pistons of the trunk type which may be operable directly in cylinders also made of a light metal or alloy.

From one aspect, the present invention consists in a piston wherein the skirt or side wall thereof is inlaid with a spray deposit of a material having bearing characteristics superior to those of the basic material of the piston, in at least one of the thrust faces of the piston skirt or side wall.

From another aspect, the invention consists in a method of making a composite piston, which comprises casting a piston body, including a crown and skirt or side wall, from a light metal or alloy, forming a recess in at least one thrust face of the skirt or side wall during or subsequent to casting, spraying a material having bearing characteristics superior to those of the basic piston material into the recess to fill the latter, and machining or otherwise forming the piston and sprayed deposit to the final contour of the piston.

The invention also consists in an internal combustion engine or other prime mover, preferably incorporating one or more cylinders made of a light metal or alloy, having one or more pistons as hereinbefore defined operating therein.

In order that the invention may be more readily understood, reference will now be made to the accompanying drawing, in which:

FIGURE 1 is a diagrammatic side elevation of an inlaid piston according to one embodiment of the invention; and FIGURE 2 is a transverse section on the line 2—2 of FIGURE 1.

Referring to the drawing, there is shown an internal combustion engine piston cast from a light metal, for example from an aluminium or magnesium alloy, comprising a crown 1 and a side wall or skirt 2. The upper part of the skirt 2 constitutes the ring carrier zone, and incorporates a number of piston ring grooves 3. A pair of gudgeon pin bosses 4 (see FIGURE 2) are cast into the skirt 2, which serve to receive a gudgeon pin (not shown) for connecting the piston to the small end of a connecting rod (not shown). The skirt 2 is provided with thrust faces 5 which are disposed generally at 90° with respect to the axis of the gudgeon pin bosses 4, and are subjected to the reactive forces of the connecting rod during operation of the piston.

According to this embodiment of the invention a recess 6 is provided in each of the thrust faces 5 which contains a spray deposit or inlay 7 of molybdenum, tungsten carbide, nickel aluminide, iron, steel, or any other material having bearing characteristics, i.e. sliding and wearing properties, superior to those of the basic piston alloy. Instead of a metal, the inlay 7 may be formed from a suitable synthetic plastics material, for example, from polytetrafluroethylene, which may be sprayed on as a dispersion. Each recess 6 and, therefore, its inlay 7 is tapered and extends over the thrust face 5 between the open end of the skirt and the lowermost groove 3, although it may also extend over the lands between the grooves 3 as shown in broken lines in FIGURE 1.

Each recess may be formed during casting of the piston, or alternatively may be machined or otherwise formed subsequently to casting in a normally proportioned, conventional, trunk type piston. Each recess is filled with the bearing material prior to the final finishing of the piston, by means of a metal spraying process employing, for example, an oxy-acetylene spray gun or a plasma arc spray gun, to such an extent that the recess is slightly over-filled. The excess material is subsequently removed by machining to provide a surface which is continuous with the general external surface of the piston skirt.

When the deposited material is particularly hard, it is preferable to grind the complete piston skirt, as well as the deposited material in such a manner that the normally required ovality of the form and change of the skirt profile of the final piston is obtained. Certain deposits may be turned with normal tools or may be diamond honed, depending upon the surface finish required.

Pistons of the type described are capable of operating effectively in engines having cylinder blocks or crank cases made of a light metal alloy which may be similar to that of the pistons, with the pistons in direct rubbing contact with the machined but untreated alloy of the cylinder bores. It is, however, also possible for such pistons to be used in conjunction with alloy cylinder blocks or crank cases provided with ferrous or hard metal cylinder liners, sprayed or plated cylinder bores, or ferrous blocks or crank cases.

The invention is applicable to pistons having differing design details with regard to crown shape, supporting ribs or webs, skirt stiffening bands, and thermal barriers such as slots. The invention may also be applied to autothermic and solid or split skirt pistons. Moreover, the pistons may be made from a variety of different aluminium or magnesium alloys, or alloys of other materials, or from non-metallic materials.

The piston may have an inlay in one instead of both thrust faces, and additionally in other regions of the piston surface, and the configuration of the or each inlay may differ from that shown in the drawing, for example, the or each inlay may be divided into separate segments. The or each recess may be given a surface configuration which enhances the keying of the inlay to the piston.

We claim:
1. A light alloy piston for internal combustion engines or other prime movers, comprising a crown, gudgeon pin boss means, a side wall depending from and integral with the crown, having mutually spaced and opposed thrust faces displaced circumferentially around the periphery of the side wall from the axis of the gudgeon pin boss means, a recess in at least one of said thrust faces which, in a circumferential direction, is substantially coextensive with said thrust face and, in a direction longitudinally of the piston extends over a substantial part of the side wall and an inlay comprising a spray deposit of a material having bearing characteristics superior to those of the light alloy of the piston contained in said recess.

2. A light alloy piston according to claim 1, wherein said inlay is composed of a material selected from the following group, namely: molybdenum, tungsten carbide, nickel aluminide, iron, steel and synthetic plastics.

3. A piston according to claim 2, including two diametrically opposed thrust faces, a separate recess in, and substantially coextensive in a circumferential direction with, each thrust face, and an inlay of said material in each recess, each inlay extending in a longitudinal direction between the lower end of the side wall and a piston ring groove carrier zone of the side wall adjacent the crown, the side edges of each inlay diverging towards the lower end of the side wall.

4. A piston according to claim 3, wherein each inlay additionally extends over the piston ring groove carrier zone.

5. A method of making a composite piston which comprises casting a piston body, including a crown, gudgeon pin boss means, and a depending side wall, integrally from a light metal alloy, forming a pair of diametrically opposed circumferentially spaced recesses in the external surface of the side wall on opposite sides of the axis of the gudgeon pin boss means, spraying a material having bearing characteristics superior to those of the basic piston material into said recesses to fill the latter, and forming the piston and sprayed inlays to the final contour of the piston, the extent of the recesses and associated inlays being such that said inlays each constitute one of the opposed thrust faces of the side wall.

6. A method according to claim 5, comprising spraying into the recess, a material selected from the group including molybdenum, tungsten carbide, nickel aluminide, iron, steel and synthetics plastics, by means of a plasma arc or oxy-acetylene spray gun, such that the recess is slightly overfilled, whereafter the excess inlay material is removed by machining to provide the final surface of the piston side wall.

7. A light alloy piston comprising a crown, a tubular, substantially circumferentially continuous side wall depending from and integral with the crown, said side wall including a skirt portion spaced from the crown by a piston ring groove carrier portion, a pair of generally diametrically opposed gudgeon pin bosses integral with the side wall and disposed on a common transverse axis, a pair of discrete diametrically opposed thrust faces disposed externally of the skirt portion and displaced circumferentially by substantially 90° from said common transverse axis, two downwardly diverging recesses in the external surface of at least the skirt portion substantially coextensive one with each thrust face and extending substantially from top to bottom of the skirt portion, an inlay comprising a spray deposit of a material possessing bearing characteristics superior to those of the light alloy of the piston contained in each recess and blending into the external contours of the skirt portion, said inlay material being selected from the group consisting of molybdenum, tungsten carbide and nickel aluminide, whereby the thrust faces have the bearing characteristics of the selected inlay material.

References Cited

UNITED STATES PATENTS

| | | | |
|---|---|---|---|
| 1,875,039 | 8/1932 | Leeak | 92—224 X |
| 1,947,493 | 2/1934 | Rose et al. | 92—223 X |
| 2,261,405 | 11/1941 | Nicolle | 92—224 X |
| 2,817,562 | 12/1957 | Fleming et al. | 92—223 X |
| 2,833,668 | 5/1958 | Dailey et al. | |
| 2,992,869 | 7/1961 | Van der Horst | 92—223 |
| 3,220,101 | 11/1965 | Roy | 29—156.5 X |
| 3,295,198 | 1/1967 | Coan | 29—156.5 X |

MARTIN P. SCHWADRON, *Primary Examiner.*

G. N. BAUM, *Assistant Examiner.*